United States Patent [19]

Gordon et al.

[11] Patent Number: 4,811,038

[45] Date of Patent: Mar. 7, 1989

[54] INK JET PRINTING SYSTEM AND DRUM THEREFORE

[75] Inventors: Thomas Gordon, Hebron; Kenneth O. Wood, Ellington, both of Conn.

[73] Assignee: Metromedia Company, Secaucus, N.J.

[21] Appl. No.: 162,418

[22] Filed: Mar. 1, 1988

Related U.S. Application Data

[63] Continuation-in-part of Ser. No. 38,159, Apr. 14, 1987, abandoned.

[51] Int. Cl.[4] .......... G01D 15/28

[52] U.S. Cl. .......... 346/140 R; 101/415.1; 346/138; 358/75

[58] Field of Search .......... 346/140, 138, 75; 358/75, 77, 78, 296; 101/415.1; 40/603

[56] References Cited

U.S. PATENT DOCUMENTS 4,412,225 10/1983 Yoshida .......... 358/75 X
4,446,470 5/1984 Sugiyama .......... 346/140
4,547,786 10/1985 Logan .......... 346/140
4,680,596 7/1987 Logan .......... 346/140
4,754,566 7/1988 Gordon .......... 40/603

*Primary Examiner*—Joseph W. Hartary
*Attorney, Agent, or Firm*—McCormick, Paulding & Huber

[57] ABSTRACT

An ink jet printing system has a low aspect ratio cylindrical drum adapted to support a sheet of material to be printed by a computer controlled printing head of a plurality of pigmented inks. The drum is preferably of approximately the same diameter as its axial length, is made up of at least two spoked wheel assemblies consisting of several arcuate wheel segment subassemblies that are joined together and held in place by a corregated skin covered with a fiberglass layup to provide a smooth cylindrical surface onto which the sheet material is spread. A clamping device is provided for tensioning the sheet material as it is rotated past a carriage carrying the printing head and affording two relative movement directions as between the printing head and the sheet to be printed for these differently colored printing inks.

12 Claims, 7 Drawing Sheets

INK JET PRINTING SYSTEM AND DRUM THEREFORE

This application is a continuation-in-part of Ser. No. 038,159, filed Apr. 14, 1987, now abandoned.

This invention relates generally to ink jet printing on sheet material, and deals more particularly with an ink jet printing system especially suited to printing large graphics such as outdoor advertising, billboards and signs or displays for use in railway or airport terminals, shopping malls and other public areas. This invention represents an improvement over that described and claimed in issued U.S. Pat. No. 4,547,786 entitled INK JET PRINTING SYSTEM and assigned to the assignee herein. The disclosure in said patent is incorporated by reference herein. This invention also relates to the handling of flexible sheet material to be printed copending, application filed Apr. 14, 1987 under Ser. No. 038,300, now U.S. Pat. No. 4,754,566, and entitled CLAMPING DEVICE FOR HOLDING FLEXIBLE SHEET MATERIAL is also incorporated by reference. The said copending application is also assigned to the assignee herein.

BACKGROUND OF THE INVENTION

Where the above-mentioned U.S. Pat. No. 4,547,786 related to an ink jet printing system for printing onto a plurality of flat rigid panels, the present invention relates to an ink jet printing system wherein the printing head is moved laterally of a rotating cylinder such that the material to be printed on is wrapped around the cylinder and the cylinder rotated to provide movement of the printing head relative to the sheet in one direction, and wherein the printing head is provided on a moveable carriage for relative movement between the sheet and the printing head and another coordinate direction. The printing heads comprise a closely spaced array of differently pigmented ink which are adapted to eject relatively large volume drops onto the sheet material to create the desired graphic.

SUMMARY OF THE INVENTION

This invention resides in an ink jet printing system wherein one or more differently pigmented inks are printed onto a flexible sheet material wrapped around a cylindrical drum. Means are provided for rotating the drum on its central axis and ways are provided parallel the axis for moving an ink jet printing station parallel to the drum axis. Encoding means is provided for monitoring the angular position of the rotating drum, and means is provided responsive to the encoding means for timing operation of the ink jet printing head. The drum is preferably oriented with its axis horizontally arranged, and the drum has a diameter at least as great as the axial length of the drum. The drum is preferably made up of at least two spoked wheel assemblies that support the cylindrical skin structure, and the wheel assembly further includes a plurality of wheel segment subassemblies.

DETAILED DESCRIPTION OF THE PREFERRED EMBODIMENTS

Figure 1:
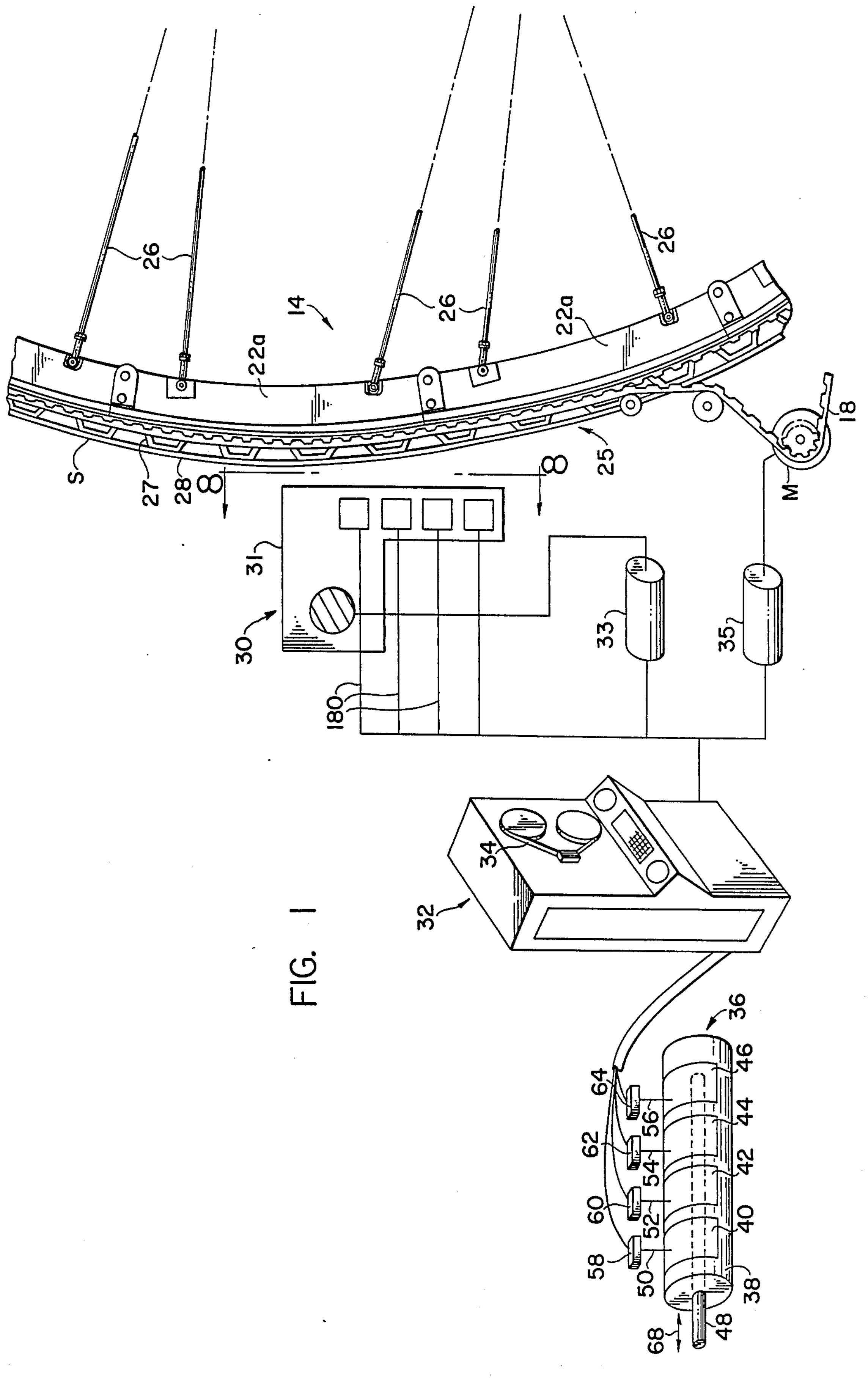
FIG. 1 is a schematic view showing an ink jet printing system embodying the invention.
Figure 2:
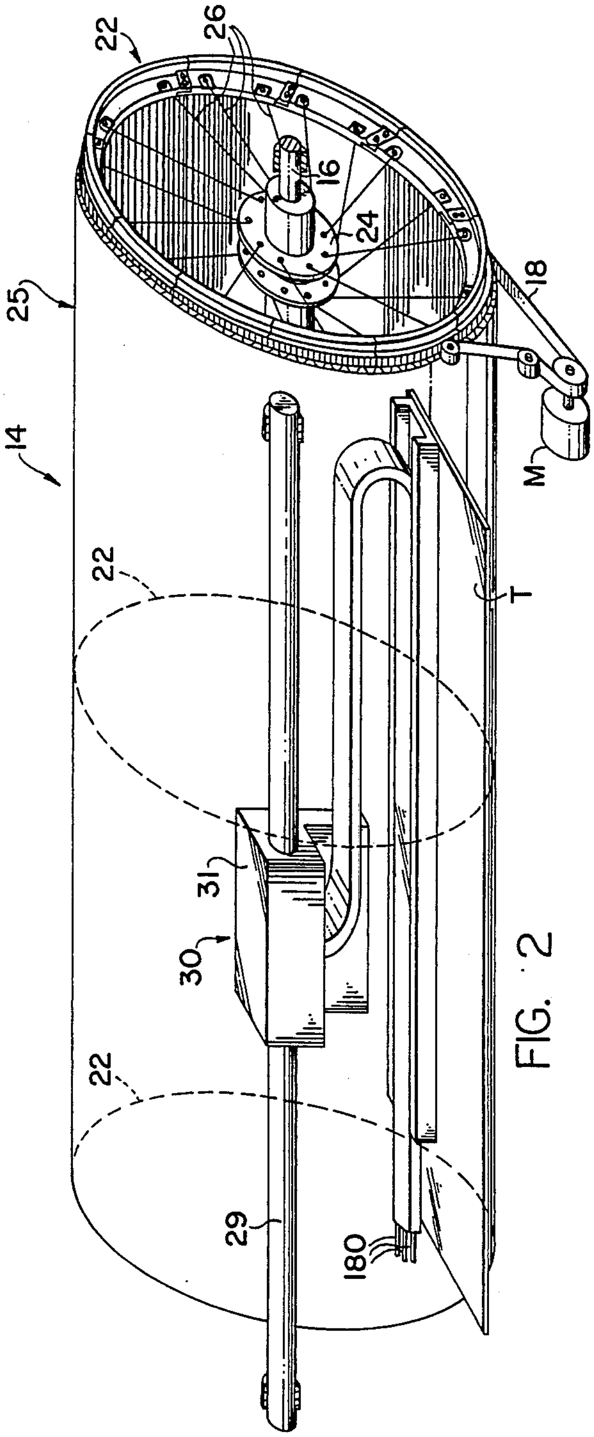
FIG. 2 is a perspective view illustrating the overall configuration of the cylindrical drum, and also showing the horizontally reciprocating carriage assembly in which the printing head is provided. This view does not show the drum in correct proportional length and diameter.

Referring to the drawings in greater detail, FIG. 1 illustrates an ink jet printing system embodying the invention and including drum means 14 defining a circumferential cylindrical surface S for supporting sheet material to be printed. FIG. 2 illustrates the cylindrical drum means 14 and also shows a horizontally extending support shaft 16 at the drum's central axis such that the drum can be rotated by means of a motor and drive belt illustrated generally at M and 18 respectively. The belt 18 preferably includes timing notches which fit into teeth provided for this purpose in one of the three support wheel assemblies normally provided in a drum of the size and shape disclosed here. The drum preferably has a diameter at least as great as the axial length of the drum itself, and at least two spoked wheel assemblies are provided, one at either end of the drum. However, when an elongated drum is utilized as suggested in FIG. 2 three such wheel assemblies may be provided one at either end and another in the center of the drum means 14.

Figure 3:
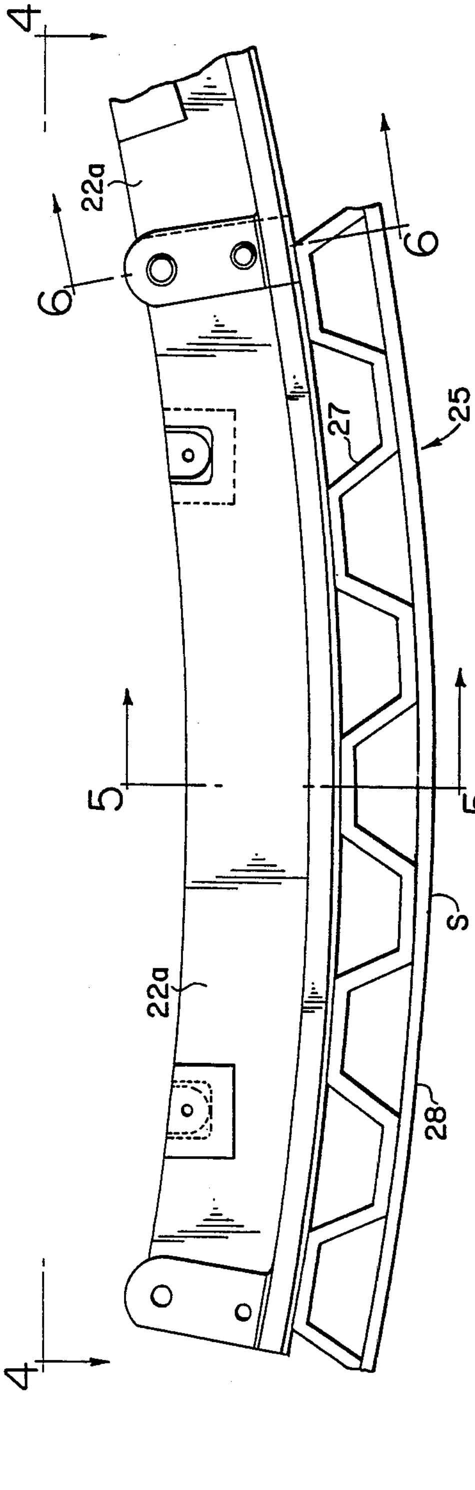
FIG. 3 is an expanded view of a portion of the drum periphery as shown in FIG. 1.
Figure 4:
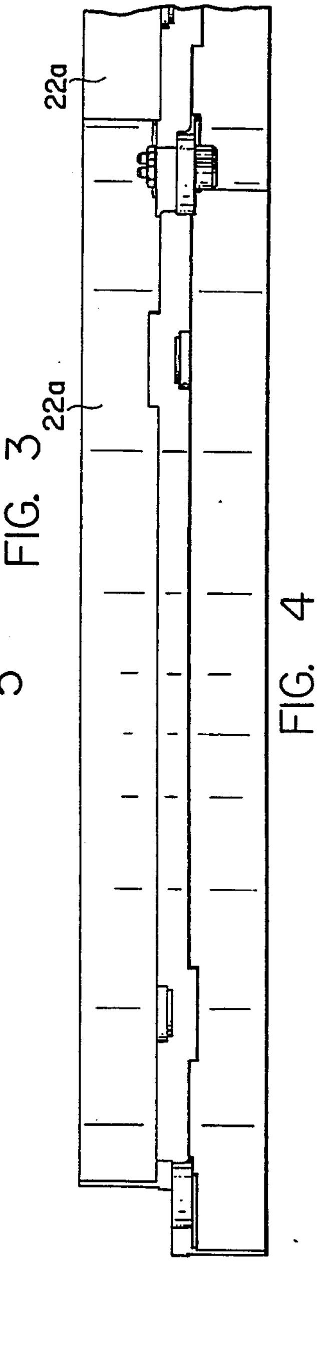
FIG. 4 is a view taken generally on the line 4—4 of FIG. 3.
Figure 5:
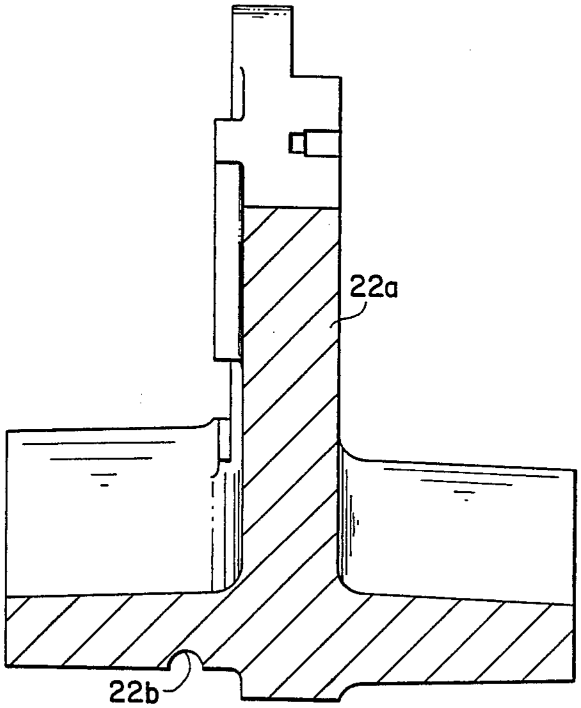
FIG. 5 is a horizontal section taken generally on the line 5—5 of FIG. 3 but with the skin of the drum being omitted so as to better illustrate the arcuate segment of the drum assembly.
Figure 6:
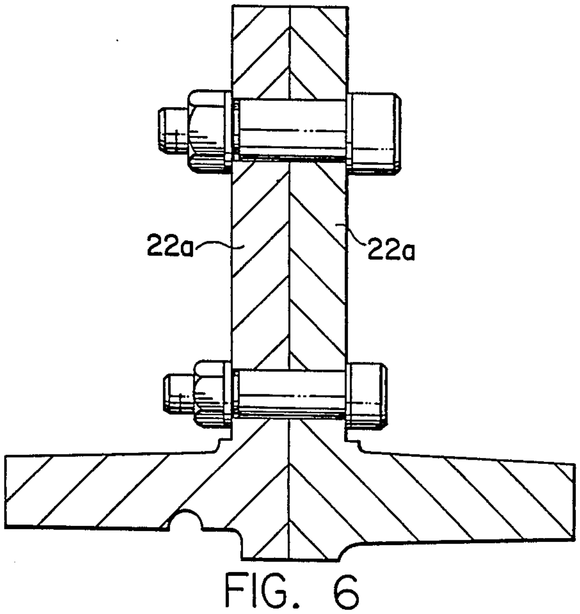
FIG. 6 is a view generally taken on the line 6—6 of FIG. 3 and illustrates the joint between two adjacent wheel segment assemblies.
Figure 7:
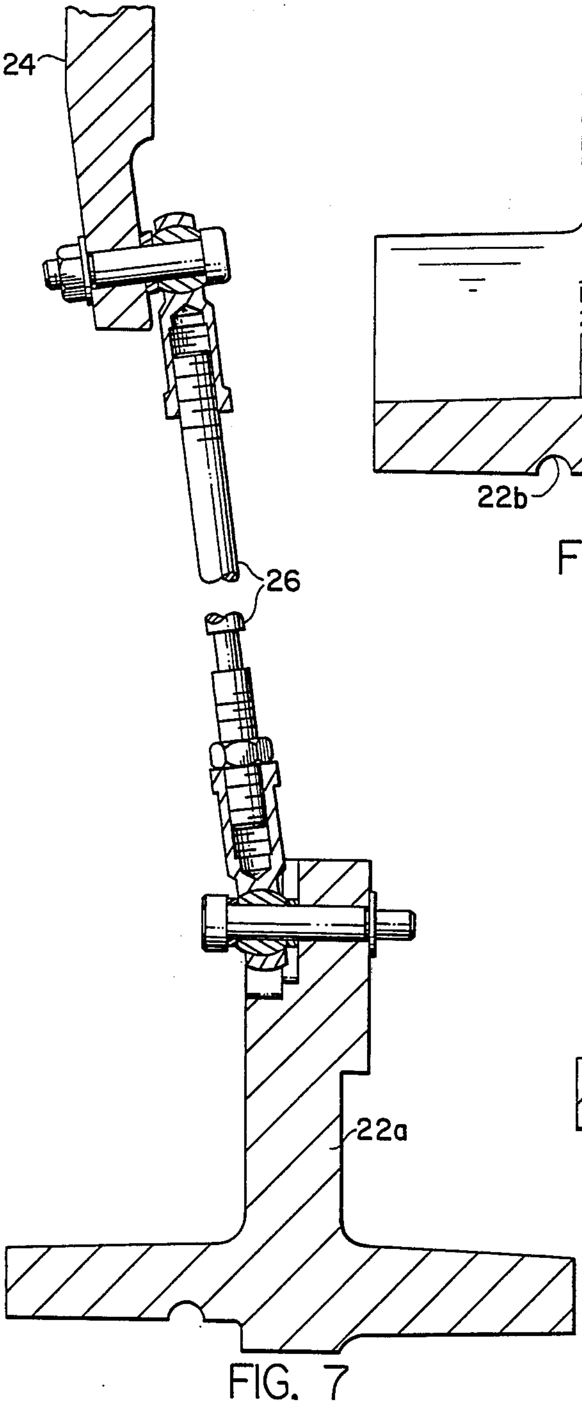
FIG. 7 is a view illustrating the connection between a single spoke in one of the three wheel assemblies provided in the drum illustrating the connection between the ends of the spoke and the wheel segment and hub portions of the drum.

Each of the spoked wheel assemblies 22,22 is made up of a plurality of individual wheel segment subassemblies one of which is shown at 22*a* and FIGS. 3 and 4. Each wheel segment subassembly includes an arcuately shaped wheel segment having ends that interfit with adjacent segments as suggested at the low portion of FIGS. 3 and 4. FIG. 6 illustrates the joint between two adjacent wheel rim subassemblies. FIG. 5 illustrates the T-shaped cross sectional configuration for the wheel segment 22a. FIG. 7 illustrates the wheel segment 22a connected to the hub structure 24 by a spoke 26. One end of the spoke 26 is connected to the wheel segment 22a and the other or inner radial end of the spoke 26 is in turn connected to the hub 24 in much the same manner as a typical bicycle wheel. However, the outer rim of the spoked wheel assemblies provided herein are segmented as described above and therefore more readily fabricated than would be the case should conventional bicycle wheel technology be adopted for fabricating a drum means in accordance with the present invention.

Still with reference to the drum means 14, FIG. 3 also illustrates the cylindrically shaped outer skin 25 of the drum means 14 as including a corrugated metal skin 27 that serves to support the three spoked wheel assemblies 22,22 in axially spaced relationship on the support shaft 16. The skin of the drum further includes an outer cylindrical surface defining fibreglass layup 28 for achieving good support for the flexible sheet material on or which the printing head to be described prints the desired graphics.

Although not shown herein, a predetermined laterally extending area of the drum means 14 is provided with a clamping device such as that shown and described in the above-identified copending patent application to provide a convenient means for securing a flexible sheet of material to be printed on the outer surface S of the drum as defined by the thermoplastic outer skin 28. The clamping device incorporated by reference herein from that copending application serves to secure the vinyl material under a slight tension on the drum surface in a manner that will assure accurate printing of the pigmented inks under the control of the computerized controller to be described.

The operation of the ink jet printing heads and the rotation of the drum means is controlled by a computerized controller 32. The printing station 30 is provided on a supporting carriage 31 so as to be moveable horizontally parallel to the central axis of the drum means on a support rail 29. Although the rail is illustrated as having a cylindrical cross section it will be apparent that other cross sections can be utilized to provide stability for the carriage during its movement laterally of the cylindrical drum 14. Drive means is provided in the carriage for achieving this longitudinal motion for the carriage and the printing station. Such a drive motor is indicated generally at 33 in FIG. 1 where it is also apparent that the carriage drive motor 33 is controlled by the controller 32.

Figure 8:
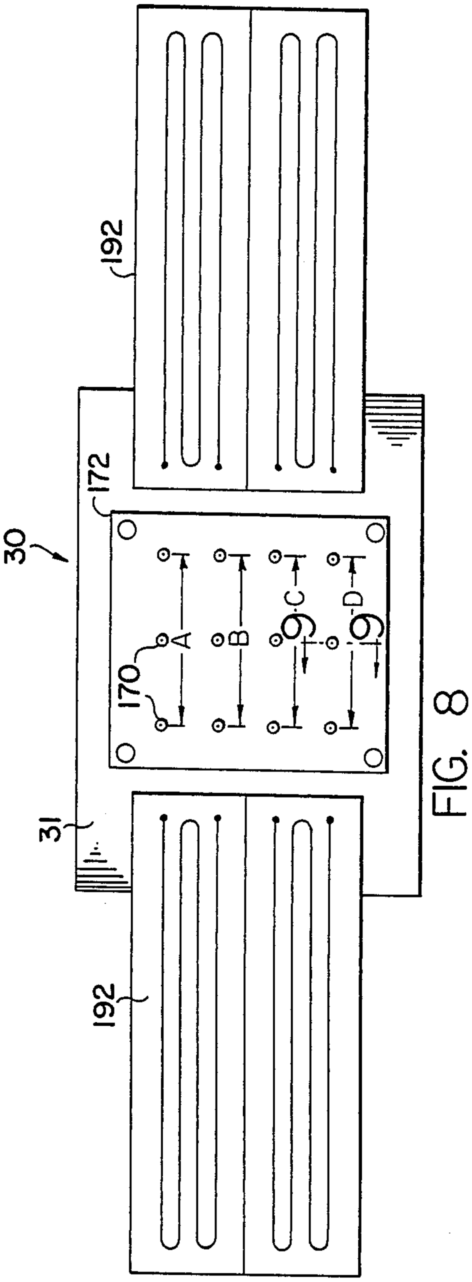
FIG. 8 is a view taken on the line 8—8 of FIG. 1 showing the printing station with an array of ink jet printing heads and also illustrating heaters provided adjacent these heads.

The printing station includes an array of printing heads as indicated generally in FIG. 8. Rotation of the drum means 14 can be utilized to provide a particular printing head at a predetermined location for energizing a particular printing head, and the controller 32 is provided with shaft encoding means for monitoring the angular position of the rotating drum. Such an encoder is illustrated generally at 35 in FIG. 1, and the signal therefore is drawn from the drive shaft associated with the means M for rotating the drum. Timing of the excitation of the various printing heads is slaved to the motion of drum means 14 through encoder unit 35 and the controller 32 is capable of precisely positioning the drum means 14 and its sheet to be printed relative to the vertically separated printing heads in the array of FIG. 8. Shaft encoding means is also provided in conjunction with the drive motor 33 for the carriage 31 in order that the horizontal or axial spacing between the printing heads also be precisely taken into account in connection with the computerized printing performed with an apparatus of the present invention.

Graphics information controlling the excitation of the ink jet printing heads to cause each head to either print or not print a drop at each potential drop location on the surface of the sheet may be supplied to the controller 32 in various different ways. For example, it may be in the form of preprocessed information recorded onto a magnetic tape 34 read by the controller, or it may be supplied by a scanner 36 associated with the controller 32.

The scanner 36 shown in FIG. 1 provides graphic input information to the controller 32 and it also may take any one of a variety of different forms. By way of illustration the scanner 36 is shown as one adapted for use in printing in a four color polycromatic half-tone manner. It includes a transparent drum 38 onto which four color separation negatives 40,42,44 and 46 may be mounted in registration with one another. Each negative is preferably a continuous tone and prepared from the original artwork to be reproduced on the sheet. The reader is referred to prior U.S. Pat. No. 4,547,786 for a more detailed description of the scanner. For present purposes, it is noted that the negative 40 may be a black separation negative, the negative 42 a cyan separation negative, the negative 44 a magenta separation negative, and the negative 46 a yellow separation negative. Inside the drum a device 48 emits four laser beams passing respectively through each of the separation negatives and detected by associated photo detectors 58, 60, 62 and 64. The drum 38 is rotatable about a central axis and the four beams are moveable in unison along the axis as indicated by the arrow 68. Each time the drum means executes one full revolution the scanner executes one read cycle during which it reads one line of information from the negatives 40, 42, 44 and 46. In each such cycle the drum 38 is rotated a small increment and the laser beams 50, 52, 54 and 56 are then moved across the negatives 40, 42, 44 and 46 to produce information from the detectors 58, 60, 62 and 64 processed by the controller 32 to control the operation of the ink jet printing heads during one revolution of the drum means. The controller 32 includes a buffer memory for temporarily storing one or more lines of information from the detectors 58, 60, 62 and 64 so that during one revolution of the drum means the information used to excite the printing heads is information obtained by the scanner 36 and processed by the controller 32 during preceding revolution of the drum.

Figure 10:
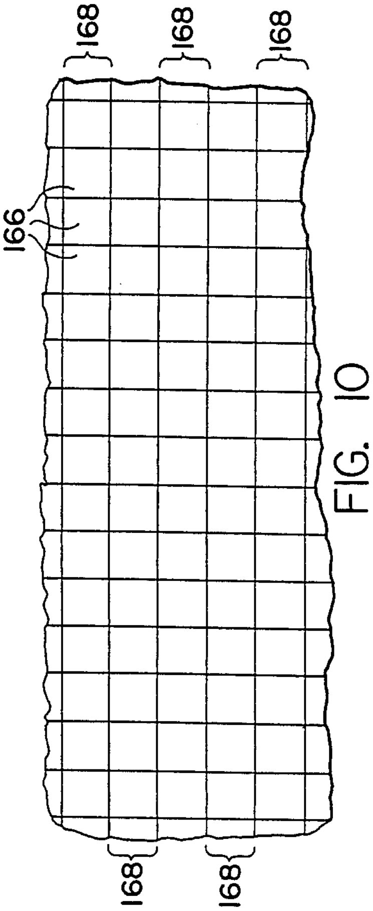
FIG. 10 is an enlarged, fragmentary view showing a portion of the sheet surface to be printed and illustrating the manner in which such a surface is divided into pixels through the operation of the system of FIG. 1.

The printing station 30 of the FIG. 1 system may be equipped with only a single ink jet printing head, or with several such heads all printing the same color in order to produce a monochromatic graphic. However, the system preferably is used to generate polychromatic graphics and for this reason is equipped with ink jet printing heads printing either three colors (cyan, magenta and yellow) or four colors (cyan, magneta, yellow and black) in a polychromatic half-tone manner such as generally described in prior U.S. Pat. No. 4,367,482. One or more printing heads may be used for each color. By way of example, and in the following discussion, it is assumed that the printing station 30 has twelve ink jet printing heads for printing four different colors, there being three heads for printing black, three for printing cyan, three for printing magenta, and three for printing yellow. It is also assumed that the half-tone printing process involved uses square pixels measuring one tenth inch on a side. As shown in FIG. 10, the pixels are indicated at 166,166, and arranged and blend in successive side by side horizontal bands 168,168. Each band 168 represents effectively the amount of printing performed by all of the printing heads during one revolution of the drum, but as explained hereafter, all four colors are not printing out of the same band 168 during the same drum revolution. Instead, during one drum revolution the four colors are individually printed onto four separate bands 168,168 vertically separated from one another.

Figure 9:
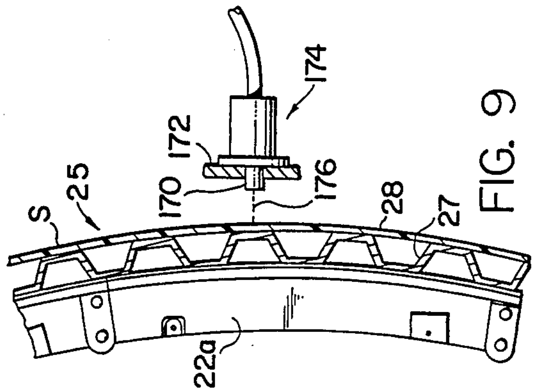
FIG. 9 is a view taken on the line 9—9 of FIG. 8 showing one of the ink jet printing heads of the printing station.

FIG. 8 shows the arrangement of the discharge nozzles of the twelve ink jet printing heads, and FIG. 9 shows generally the outward appearance of one of the heads 174. The head 174 as are all eleven other of the heads, is mounted to a mounting plate 172 with its nozzle 170 extending through the plate and directed onto the passing surface S of the sheet material wrapped on the outer skin 25 of the drum. Thus, an ink drop ejected from the nozzle 170 moves from the nozzle onto the surface S along a generally horizontal line of flight as suggested at 176. The printing head 174 may be of various different types but preferably is a piezo electric activated drop-on-demand type capable of ejecting relatively large volume drops of pigmented ink. Preferably all twelve of the heads included in the printing station are of a construction similar to that shown by the patent application filed in the name of Leonard G. Rich concurrently with the filing of U.S. Pat. No. 4,457,786 and entitled INK DROP EJECTING HEAD, also assigned to the assignee herein.

As shown in FIG. 8 the twelve nozzles 170,170 comprising the array at the printing station are arranged three each in four vertically spaced horizontal rows A, B, C and D. The three nozzles of each row print a different color. That is, the three nozzles of row D may print yellow colored drops, the three nozzles of row C may print magenta colored drops, the three nozzles of row B may print cyan colored drops, and the three nozzles of row A may print black colored drops. The appropriately colored ink is supplied to each printing head by a supply tube (not shown) connected to a supply resevoir (not shown) in the carriage 31.

Signals to activate one or more of the printing heads is provided from the controller 32 through lines 180 shown schematically in FIG. 1 and shown also in FIG. 2 as arranged in a ribbon such that these signals can be continuously provided to the moveable carriage 31, the ribbon being laid in a trough provided for this purpose on a platform T where an observe might stand to observe the operation of the printing system of the present invention.

Figure 11:
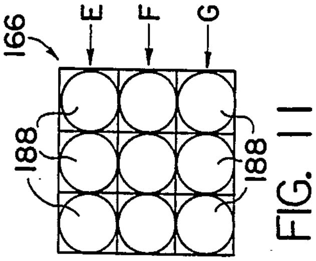
FIG. 11 is an illustration showing the arrangement of potential ink drop locations within one of the pixels of FIG. 10.

As shown in FIG. 11 each pixel 166, which is one tenth of an inch square size, contains nine ink drop locations, represented generally by the circles 188,188. Each circle has a center 190,190 that are spaced 0.033 inches from one another both horizontally and vertically. Thus, in each pixel there are three horizontal rows E, F and G containing three ink drop locations 188,188. Although not readily apparent from FIG. 8, the three nozzles 170, 170 of each row A, B, C and D are vertically spaced from one another by a distance of 0.033 inches so as a receiving surface passes the printing station the three nozzles 170,170 of a row such as row D for example if operated print ink dots respectively along the three different lines E, F and G of the associated band 168 of pixels. As viewed in FIG. 8 in each row the left nozzle 170 may be the lowest one, the middle nozzle may be 0.033 inches above the left nozzle, and the right nozzle may be the highest in position 0.033 inches above the middle nozzle. Therefore in each pixel the left nozzle 170 will print the lower row G of drop locations, the middle nozzle will print the middle row F of drop locations, and the right nozzle will print the upper row E of drop locations. Each drop location of a pixel is printed only if desired in accordance with the graphic information supplied by the controller 32. The horizontal spacing between pixel locations appearing on a row E, F or G is determined by the slaving of the printer hesitation to the movement of the drum 14 or carriage 31 and such excitation is provided so that each time the drum moves 0.033 inches relative to the printing station or the carriages moves 0.033 inches relative to the drum a decision is made as to whether or not each printing head 170 will be actuated.

As also evident from FIG. 8 the four rows A, B, C and D of nozzles 170,170 are spaced vertically from one another. This means that during one revolution of the drum 14 nozzles of the row D will print yellow colored dots along one low pixel band 168. The nozzles of row C will print magneta drops along another band 168 spaced upwardly from the lower band, and the nozzles of row B and of row A will likewise print respectively cyan drops and black drops along two other bands 168,168 above the low band. Therefore, after one band 168 is printed with yellow drops that same band will not be printed with magenta drops until the drum executes a number of revolutions dependent on the spacing between the nozzle rows C and D and the height of each pixel. For example, where the height of each pixel is one tenth of an inch the verticle spacing between the rows A, B, C and D may be two inches. Therefore the carriage will have to execute twenty revolutions between the time a band 168 is printed with yellow drops and the time the same band is printed with magenta drops, it can be assumed that during the printing process the drum will have moved the sheet material relative to the printing station incrementally droping downwardly 0.1 inches per revolution. At full speed five minutes will elapse between the printing of different colors on a given band 168. That is, for a given pixel of a given band the pixel will first be printed with drops of yellow: five minutes later it will be printed with drops of magenta: five minutes later it will be printed with drops of cyan: finally, five minutes later it will be printed with drops of black. This delay in the printing of a pixel with the different colors advantageously allows the drops of one color to dry before drops of another color are applied. If the drops are not dry the pigments of the drops may mix and produce and undesirable muddy color.

Finally, the drying of the drops of one color ink before drops of another color are applied may be enhanced by heating the drum and consequently the drops after their application. This heating may be accomplished in various ways but in the illustrated case of FIG. 8 is performed by two radiant heaters 192 attached to the carriage 31 either at the same level as the group of nozzles 170,170 or arranged above and below the nozzle group (not shown) to direct heat onto the printed sheet material spread on the drum.

DETAILED DESCRIPTION OF FIGS. 12-14

Figure 12:
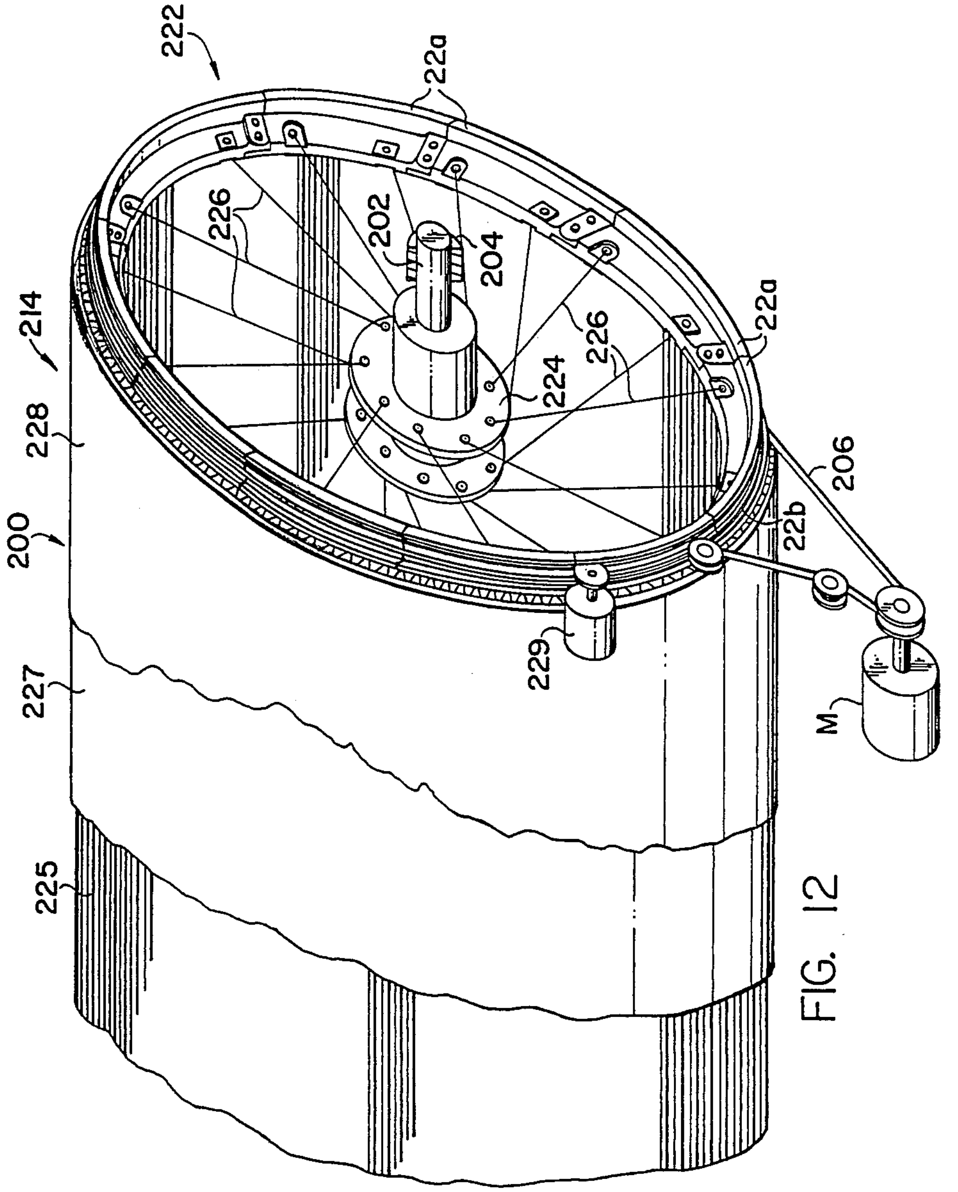
FIG. 12 is a perspective view with portions broken away of an alternative drum construction.
Figure 13:
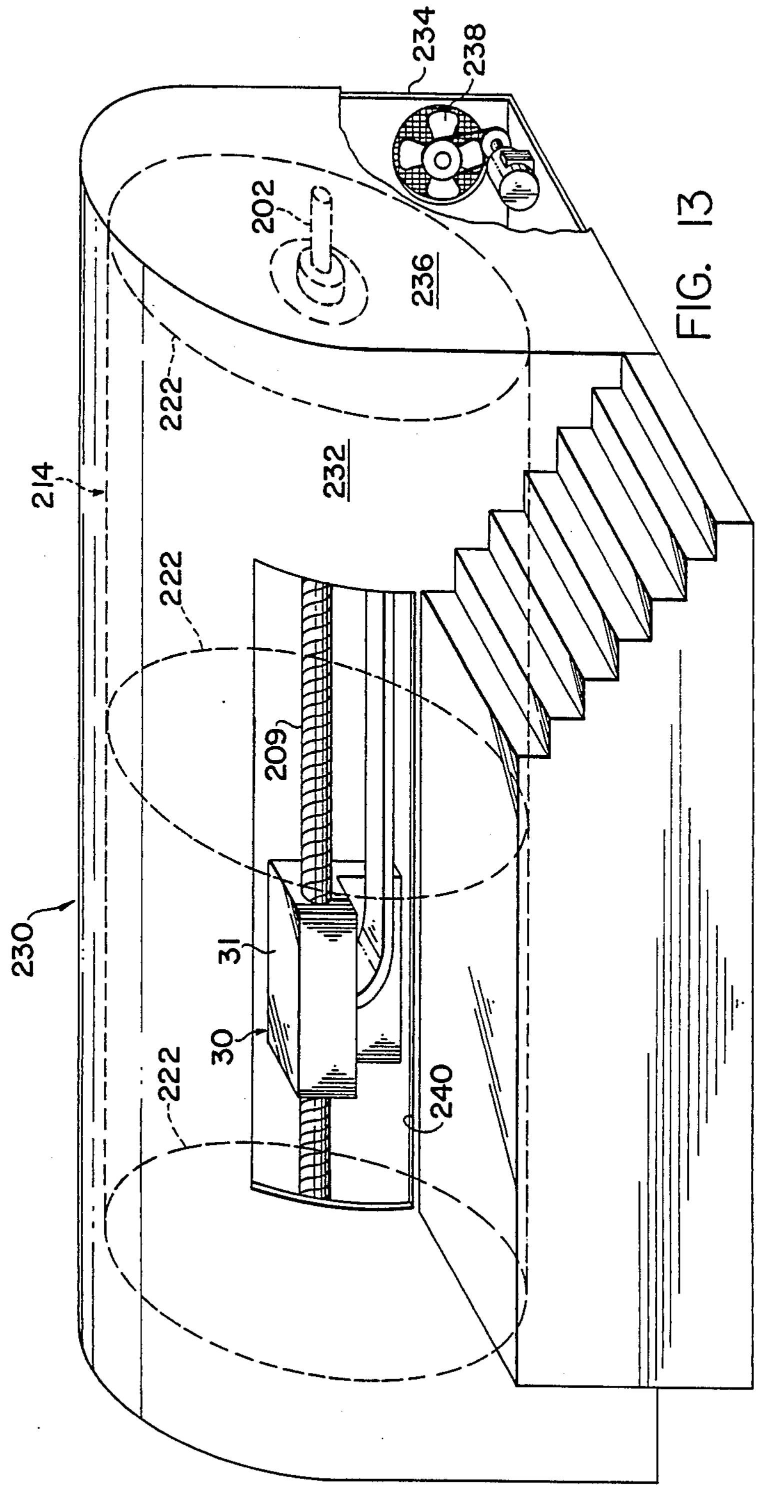
FIG. 13 is a perspective view of the drum of FIG. 12 in an enclosure.
Figure 14:
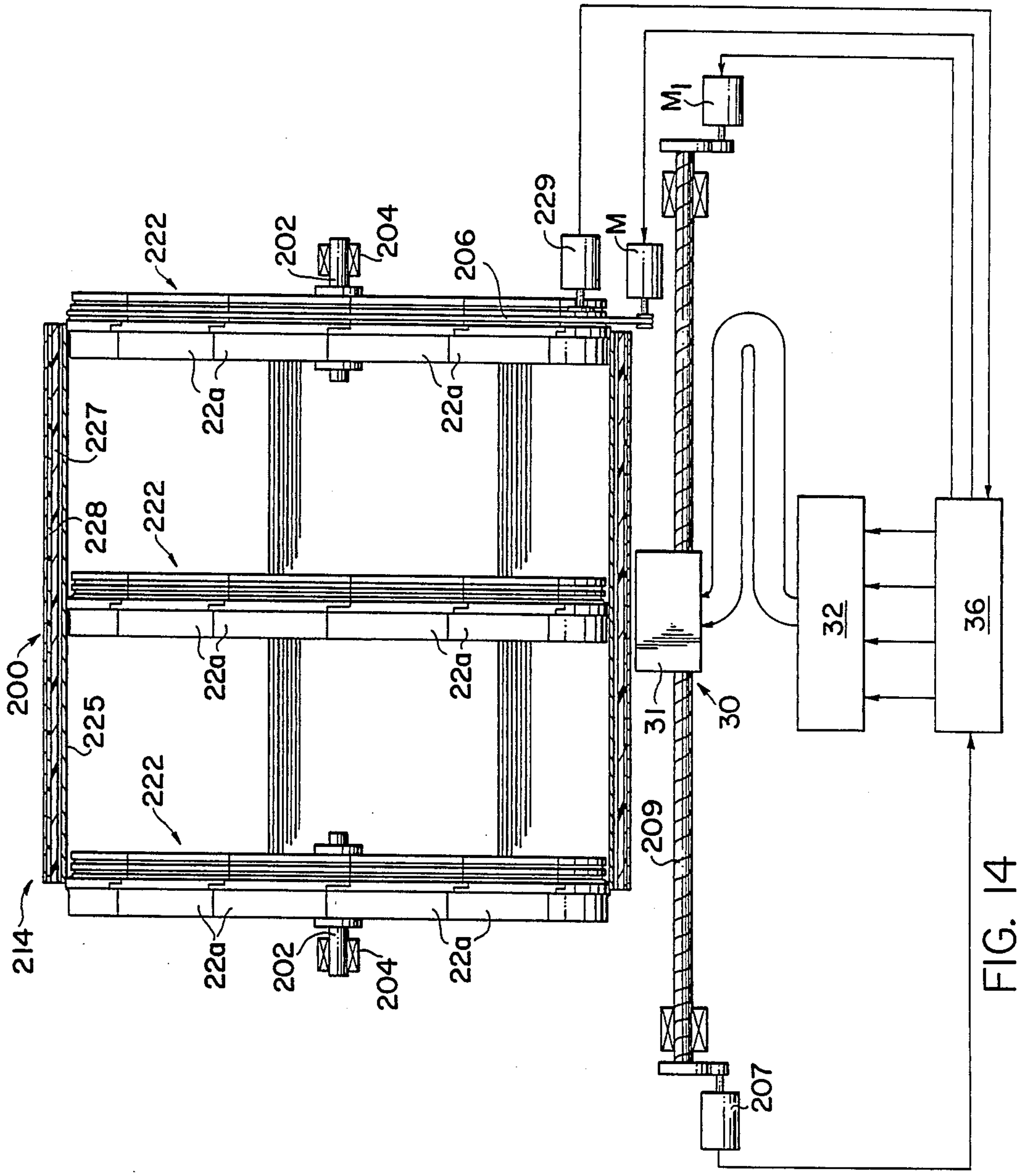
FIG. 14 is an schematic view of the alternative drum construction and other components of FIG. 12 and associated components of a system incorporating the enclosure of FIG. 13.

In the preferred embodiment of FIGS. 12-14 the drum 214, like the drum 14 of FIGS. 1-11 has a relatively large diameter with reference to its axial length. Three wheel assemblies 222, 222 support the cylindrical shaped skin structure 200 as shown. The two end wheel assemblies provide the sole support for the drum on two aligned stub shafts 202,202. Fixed journal bearings 204,204 rotatably support these stub shafts as shown in FIG. 14. A single shaft such as shown in FIGS. 1-11 might also be provided.

Each wheel assembly 222 has a hub 224 and a segmented rim such that the spokes 226,226 provide a bicycle wheel type configuration when the wheel segments are assembled. As described in some detail with reference to FIGS. 3-7 each wheel rim segment has two spokes that are connected to inner and outer flanges on the hub to provide a relatively stable subassembly that provides some degree of stability when the wheel assemblies are being constructed or assembled at a particular customers location.

As suggested in FIGS. 12 and 14 one of the end wheel assemblies has a cable 206 wrapped around a substantial portion of its periphery, and the groove **22*b* in the segment 22*a* of FIG. 5 is adapted to receive such a drive cable 206. The angular position of this wheel assembly, and hence of the drum 214, is determined by a shaft encoder 229 to provide an appropriate input to the controller 32. The shaft encoder is reset to a reference value at a predetermined angular drum position to avoid any cumulative error in this controller input signal from the encoder 229. A drum drive motor M operates under the control of controller 32 to position the drum during the printing process all as described previously with reference to FIGS. 1-10.**

The printing station 30 is provided on a carriage 31 supported for precise movement longitudinally on a lead screw 209 rotatably supported parallel to the axis of rotation of the drum 214 as suggested in FIG. 14. A drive motor $M_1$ operates the lead screw under control of the controller 36, and a shaft encoder 207 senses the angular lead screw position to provide an input signal to the controller indicative of the carriage's longitudinal position relative to the drum 214.

Turning next to a detailed description of the drum itself, FIG. 12 shows the skin structure as including an inner corrugated metal skin 225 that provides the rigidity necessary to support the skin structure on the three wheel assemblies. A Styrofoam or expanded polystyrene sheet 227 is wrapped around the outside of this corrugated skin 225 and the drum is machined to assure that the drum is truly cylindrical. A fiberglass and epoxy resin outer skin 228 is then applied to provide a surface for the vinyl sheet material to be printed. The sheet material is held onto the surface of outer skin 228 by a clamping device or other means (not shown) as described previously. This construction provides accurate nozzle to vinyl sheet material to be printed distance to assure accurate dot placement.

The printing station 30 on the carriage 31 provides accurate placement of the pigmented inks via the jet printing heads as described previously. An important feature of the embodiment illustrated in FIGS. 12-14 is the provision for collecting and exhausting the fumes from these ink jet printing heads in the station 30 on carriage 31. As best shown in FIG. 13 the upper portion of the drum 214 is surrounded by a generally cylindrically shaped closely fitted shroud 230. The shroud has depending front and rear walls or skirts 232 and 234 respectively, and vertically extending end walls 236 complete the shroud or enclosure structure. An exhaust fan 238 is provided to collect the fumes from the printing process and a suitable filtering device (not shown) may be provided to treat these fumes prior to returning the filtered air to the environment. A window 240 is provided to allow access to the carriage 31 and printing station therein. This window allows environmental air into the interior of the shroud or enclosure to replace the fume laden air drawn away by the exhaust fan 238. The shroud structure may take other forms, for example a cylindrical shroud might be provided at a constant radius from the drum surface.

We claim:

1. An ink jet printing system for printing onto sheet material, said system comprising:

drum means defining a cylindrical surface for supporting said sheet material, means for rotating said drum means on a central axis, way defining means parallel said central axis, means defining an ink jet printing station and provided on said way defining means, means for moving said ink jet printing station along said way defining means, said ink jet printing station having at least one ink jet printing head for ejecting ink in pulsed droplets onto said material on said drum surface, means for selectively operating said ink jet printing head to provide ink drops along a circumferentially extending scan line at predetermined locations around said drum circumference, said means for so moving said ink jet printing station providing additional axially spaced circumferentially spaced scan lines such that substantial areas of said sheet material can be selectively subjected to said ink drop printing, and said drum means comprising at least two spoked wheel assemblies, a skin structure, said wheel assemblies having a rim supporting said skin structure.

2. The ink jet printing system of claim 1 further characterized by first encoding means for monitoring the angular position of said rotating drum, and means responsive to said encoding means for timing operation of said ink jet printing head.

3. The ink jet printing system of claim 1 wherein said drum central axis is oriented horizontally and wherein said drum has a diameter at least as great as the axial length of said drum.

4. The ink jet printing system of claim 1 wherein each wheel assembly rim including a plurality of wheel rim segment subassemblies, and fastening means connecting said rim segment subassemblies to one another.

5. The ink jet printing system of claim 1 further characterized by second encoding means for monitoring the axial (or lateral) position of said ink jet printing station defining means, and means responsive to said second encoding means for timing operation of said ink jet printing head.

6. The ink jet printing system of claim 1 further characterized by a shroud enclosing said drum means.

7. The ink jet printing system of claim 1 wherein said skin structure comprises a corrugated metal inner layer wrapped around said wheel assemblies, and a outer layer of cylindrical contour.

8. The ink jet printing system of claim 7 wherein said skin structure further comprises an expanded polystyrene layer between said outer cylindrically contoured layer and said inner corrugated metal layer.

9. The ink jet printing system of claim 6 further characterized by air moving means to exhaust the air inside said shroud, and window means to admit fresh air into said shroud adjacent said ink jet printing station.

10. The ink jet printing system of claim 4 further characterized by a shroud enclosing said drum means.

11. The ink jet printing system of claim 4 wherein said skin structure comprises a corrugated metal inner layer wrapped around said wheel assemblies, and a outer layer of cylindrical contour.

12. The ink jet printing system of claim 11 wherein said skin structure further comprises an expanded polystyrene layer between said outer cylindrically contoured layer and said inner corrugated metal layer.

* * * * *